April 2, 1968   M. L. LOVE   3,375,738
VARIABLE SPEED DRIVE

Filed Jan. 20, 1966   2 Sheets-Sheet 1

INVENTOR.
M. L. LOVE

INVENTOR.
M. L. LOVE

United States Patent Office 3,375,738
Patented Apr. 2, 1968

3,375,738
VARIABLE SPEED DRIVE
Mahlon Lloyd Love, Osco, Ill., assignor to Deere & Company, Moline, Ill., a corporation of Delaware
Filed Jan. 20, 1966, Ser. No. 521,981
8 Claims. (Cl. 74—740)

ABSTRACT OF THE DISCLOSURE

A multi-range infinitely variable speed drive for a combine threshing cylinder, the drive including an infinitely variable speed belt drive having a variable diameter driven sheave mounted on an axially shiftable shaft which serves as an input to a change-speed planetary gear train, the shifting of the planetary gear train being accomplished by axially shifting the input shaft to engage alternate sun gears in the planetary gear train.

---

This invention relates to a variable speed drive for use in an agricultural machine and more particularly to a multi-range, infinitely variable speed drive, having particular utility for driving the threshing cylinder in a combine.

Since the optimum threshing cylinder speed in a combine varies widely according to the crop being harvested or even according to the condition of the particular crop being harvested, it has been found desirable to provide a variable speed drive means for the threshing cylinder. Accordingly, many combines utilize an infinitely variable belt-type drive, which provides infinitely variable threshing cylinder speeds within a limited range. It is also known to combine the variable speed drive with a dual speed gear-type transmission to provide a dual range, infinitely variable drive, such previous drives utilizing a variable speed driven sheave offset from the threshing cylinder axis and rotating the cylinder through a shiftable spur gear which selectively engages alternate gears connected to the cylinder shaft.

The primary object of the present invention is to provide an improved combined infinitely variable speed and multi-range gear-type drive for driving a combine threshing cylinder or the like. A more specific object is to coaxially combine a multi-range planetary gear-type drive with an infinitely variable belt-type drive, and further to provide such a transmission having a compact, efficient, and rugged construction. Still another object is to provide such a transmission which can be provided in either a two- or three-speed range version, and which can easily be converted from one version to another, and which further provides a neutral position wherein the cylinder is disconnected from the power source.

These and other objects will become apparent from the following detailed description and accompanying drawings wherein.

Figure 1:
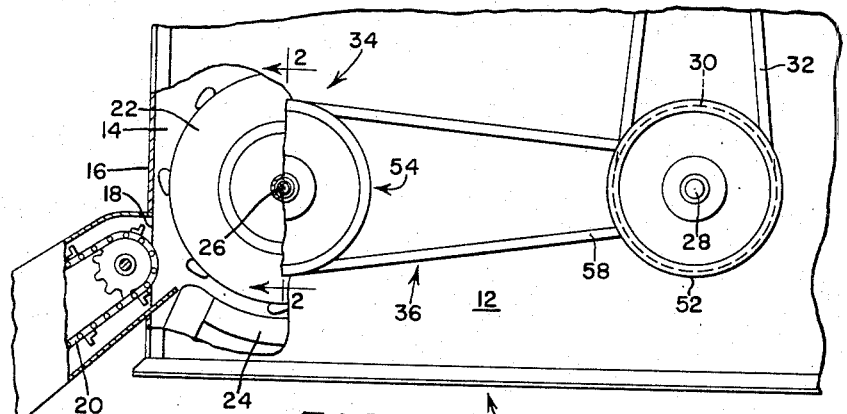
FIG. 1 is a fragmentary side elevation of a combine body with a portion of a side panel and the cylinder drive removed to show the threshing cylinder.

A typical combine includes a main separator body 10, only a portion of which is shown in FIG. 1, having opposite upright side panels 12 and 14 and a transverse front panel 16, which forms a crop-inlet opening 18. The crop is conventionally removed from the field by a forwardly disposed header (not shown) and moved rearwardly through the inlet opening 18 by a conveyor 20 to a transverse threshing cylinder 22 and an associated concave 24. The threshing cylinder 22 is shown as a conventional rasp-bar type cylinder and includes an axial shaft 26 supported at opposite ends by the side panels 12 and 14. A power source (not shown), conventionally an internal combustion engine governed to provide a relatively constant output speed, is mounted on the body 10 and includes an engine output sheave (also not shown), drivingly connected to a shaft 28 by means of a sheave 30, fixed to the shaft 28, and an endless belt 32.

The shaft 28 drives the cylinder 22 through a multi-range, infinitely variable drive means 34, which includes an infinitely variable drive portion 36, providing infinite speed variation within a limited range, and a planetary type change-speed transmission 38, providing a plurality of speed ranges. The drive means 34 includes an annular housing 40 having an enlarged, drum-shaped portion 42 at one end, terminating in an axial opening 44, and a stem-like portion 46 of reduced diameter at the opposite end terminating in an axial opening 48. The drum-shaped housing portion 42 is affixed to the side panel 12 coaxial with the cylinder 22 by a plurality of fasteners 50, the cylinder shaft 26 extending through the opening 44, and the stem-like portion 46 extending outwardly from the side panel 12.

The variable speed drive portion 36 includes a variable diameter drive sheave 52, affixed to the shaft 28, an inversely variable diameter driven sheave 54, rotatably supported on the exterior of the reduced diameter portion 46 of the housing 40 by a plurality of bearing means 56, and an endless, flexible drive element or belt 58 drivingly trained around the sheaves 52 and 54. The drive and driven sheaves 52 and 54 are of conventional construction, the driven sheave 54 having a fixed sheave face 60 including a hub 62, and an axially movable sheave face 64, including a hub 66 axially slidable on the hub 62. The diameter of the driven sheave 54 is established by an operator-actuated control means 67, here shown as an annular cam member rotatable on the smaller diameter housing portion 46 and interacting between the movable hub 66 and a radial face 68 on the drum-shaped housing portion 42 to axially shift the sheave face 64 in response to rotation of the cam member 67.

A planetary input shaft 70 is journaled and axially shiftable within the smaller diameter housing portion 46 and includes a first externally splined surface 72 at one end, extending outwardly through the opening 48; a second externally splined surface 74 at the opposite end within the housing portion 42, and a third externally splined surface 76 axially spaced a relatively short distance from the splined surface 74, the input shaft 70 having a reduced diameter 78 between the second and third splined surfaces 74 and 76. The input shaft 70 is drivingly connected to the driven sheave 54 by an internally splined member 80 affixed to the hub 62 and meshing with the splined surface 72. The input shaft 70 is axially shiftable relative to the housing portion 46 and the splined member 80 into high, neutral, and low positions, indicated by the letters "H," "N," and "L" respectively in FIG. 2. The three alternate positions are established by a detent means, here shown as an expandable ring 82 carried by the internally splined member 80 and engageable with alternate annular recesses 84, 85, and 86 on the splined surface 72, the annular recesses having inclined surfaces which expand the ring 82 by a cam action to an unlocking position. The ring 82 is relatively stiff so that a relatively large axial force on the input shaft 70 is necessary to expand the ring and permit the shifting of the shaft, thereby preventing inadvertent shifting during operation. The shaft 70 is preferably manually shiftable, the manual shifting being facilitated by a cap 88 affixed to the end of the shaft, although conventional remote control means could be provided for shifting the shaft from the operator's station. The inside annular recess 86 is inclined only outwardly so that the shaft 70 is not shiftable outwardly beyond the position labeled "H" in FIG. 2.

Figure 2:
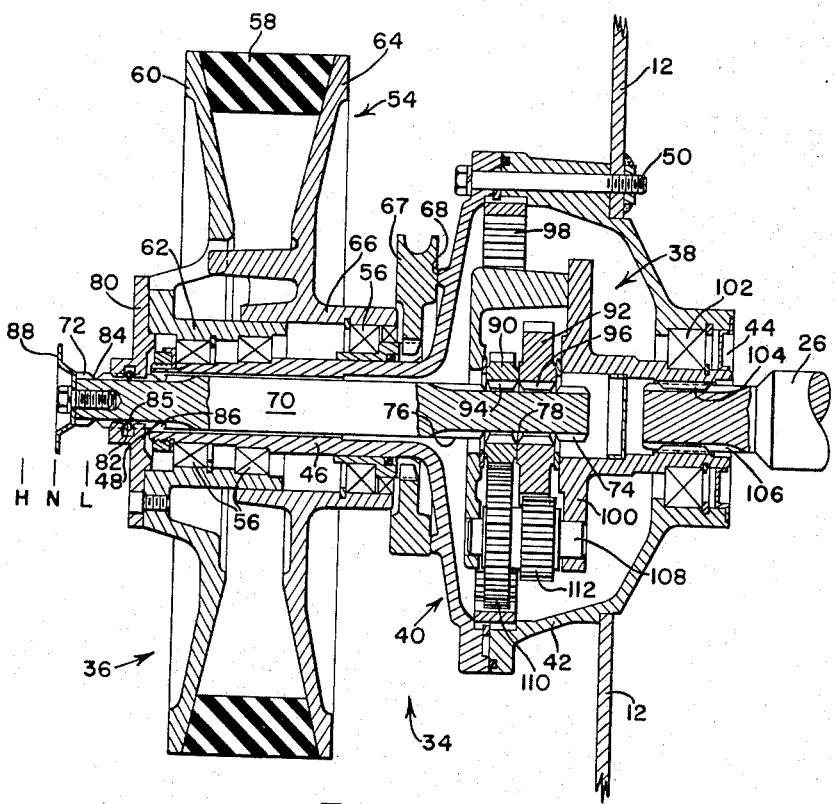
FIG. 2 is an enlarged central section of the combined infinitely variable and planetary gear drive taken along the lines 2—2 of FIG. 1, showing a dual range planetary drive in a neutral condition.

The planetary transmission 38 includes a pair of alternate sun gear elements 90 and 92 respectively having splined surfaces 94 and 96, rotatable on the reduced diameter portion 78 of the input shaft 70 when the shaft 70 is in a neutral condition as shown in FIG. 2. The planetary transmission also includes a coaxial ring gear 98 affixed to the housing portion 42, a carrier element 100, rotatably supported within the housing opening 44 by a bearing 102 and having an internal spline 104 meshing with an external spline 106 on the threshing cylinder shaft 26, and a plurality of planetary pinion means 108, rotatably carried by the carrier element 100 and including alternate coaxially affixed spur gears 110 and 112, the spur gear 110 constantly meshing with the ring gear 98 and the first sun gear element 90 and the spur gear 112 meshing with the second sun gear element 92.

In operation, when the shaft 70 is in the neutral position, as shown in FIG. 2, neither sun gear 90 or 92 is rotated and consequently the rotation of the input shaft 70 is not transmitted to the cylinder shaft 26. When the shaft 70 is shifted to its low position (to the right in FIG. 2), the third splined surface 76 meshes with the first sun gear internal spline 94, rotating the sun gear 90 and the planetary pinion means 108 through the pinion spur gear 110. Since the ring gear 98 is locked to the housing gear 42, the carrier 100, and the threshing cylinder shaft 26 splined thereto, are rotated at a substantially reduced speed relative to the input shaft speed.

If the input shaft 70 is moved to the high position (to the left in FIG. 2), the second input shaft splined surface 74 meshes with the internal spline 96 on the second sun gear element which meshes with the planetary pinion spur gear 112 to drive the planetary pinion means 108 at a substantially greater speed than in the low condition, since the second sun gear element 92 has a greater number of teeth than the first sun gear 90 and the planetary pinion spur gear 112 has a lesser number of teeth than the planetary pinion spur gear 110, although the carrier or output speed is still reduced relative to the speed of the input shaft 70. The infinitely variable drive means 36 provides infinite speed variation within the selected range, and the gear ratios in the planetary transmission 38 are preferably selected to provide a small amount of speed overlap between the low end of the high range and the high end of the low range.

Figure 3:
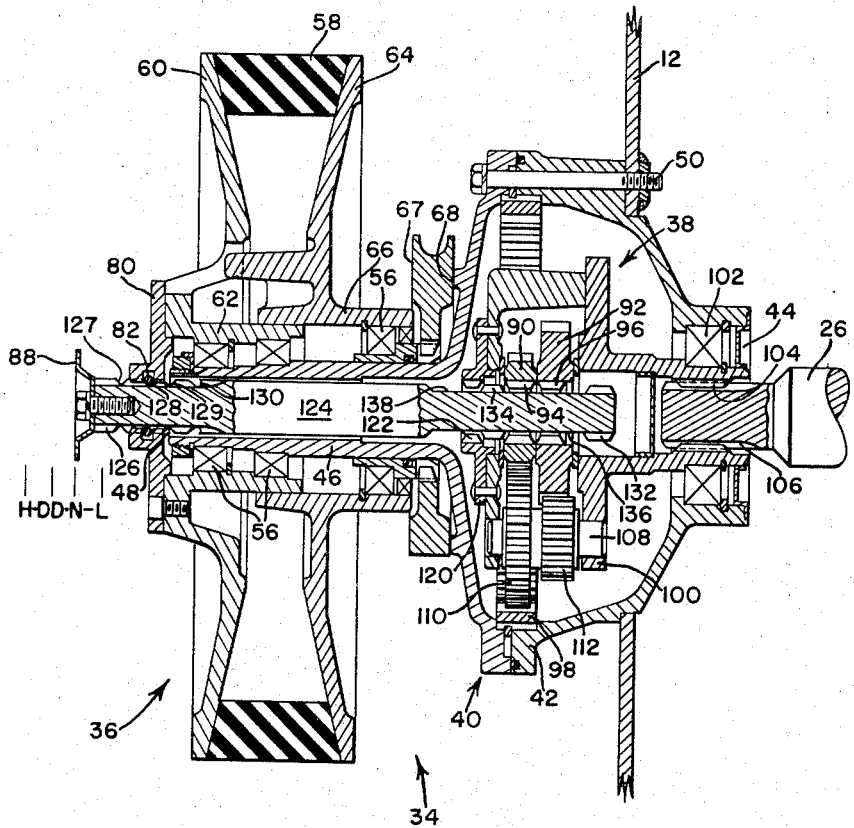
FIG. 3 is a view similar to FIG. 2 showing a slightly different embodiment of the invention, including a three-range planetary drive in a neutral condition.

The three-range embodiment of the invention shown in FIG. 3 is substantially the same as the two-range embodiment shown in FIG. 2, except that an annular member 120 having an internally splined surface 122 is coaxially affixed to the outer end of the carrier element 100, and a slightly different input shaft 124 is substituted for the input shaft 70. The input shaft 124 again has a first splined surface 126 at its outer end having four axially spaced annular recesses 127, 128, 129, and 130 respectively, the expandable ring 82 seating in the four alternate annular recesses to establish four alternate axial positions of the input shaft 124, the four positions being indicated by the letter "H" for high position, by the letters "DD" for direct drive position, the letter "N" for neutral position, and the letter "L" for low position. The input shaft 124 also includes a second splined surface 132 at its opposite end and a third splined surface 134 axially spaced a relatively short distance from the splined surface 132 and separated from the splined surface 132 by a shaft portion 136 of reduced diameter. A second shaft portion 138 of reduced diameter is on the opposite side of the splined surface 134.

In operation, when the shaft 124 is in neutral position as shown in FIG. 3, the first and second sun gear elements 90 and 92 are rotatable on the reduced shaft diameter 136 whereby the planetary transmission 38 is disconnected from the input shaft 124. When the input shaft 124 is shifted to the low position (to the right in FIG. 3), the input shaft spline 134 engages the first sun gear spline 94, and the first sun gear element 90 in turn rotates the planetary pinion spur gear 110. Since the ring gear 98 is locked to the housing 42, the carrier 100, and consequently the cylinder shaft 26 attached thereto, will be driven at a substantially reduced speed relative to the speed of the input shaft 124. When the input shaft is pulled outwardly from its neutral position (to the left in FIG. 3) to the direct drive position, the third input shaft splined surface 134 meshes with the internally splined surface 122 of the annular member 120 attached to the carrier element 100, whereby the direct driving connection is established between the input shaft 124 and the cylinder shaft 26 for rotation of said shafts at the same speed. When the shaft 124 is pulled further to the left to its outermost or high-range position, the third splined surface 134 moves to the left of the annular member internal spline 122 so that the carrier 100 is disengaged from the input shaft 124. In this position, the second input shaft splined surface 132 meshes with the second sun gear element splined surface 96, whereby the second sun gear element 92 rotates the planetary pinion 108 via the planetary pinion spur gear 112, the gear ratios being such that the carrier 100 and the cylinder shaft 26 attached thereto are rotated at a greater speed than in the low position and at a lesser speed than in the direct drive condition.

While the infinitely variable, multi-range drive is shown and described as driving a combine threshing cylinder, such a drive could also be utilized for propelling a combine or the like since it is also advantageous to have a wide range of infinitely variable ground speeds for such vehicles.

Other features and advantages of the present invention will readily occur to those skilled in the art, as will many modifications and alterations in the preferred embodiment of the invention described herein, all of which may be achieved without departing from the spirit and the scope of the invention.

What is claimed is:

1. In a combine having a main separator body including opposite side panels, and a threshing cylinder mounted within said body and including an axial shaft, the combination therewith of a multi-range infinetly variable transmission for driving said cylinder comprising: a transmission housing mounted on a side panel; an infinitely variable belt drive means including a variable diameter driven sheave journaled on said housing; an input shaft coaxially extending through said sheave and having a first end disposed in the housing interior and a second end disposed exteriorly of the housing and connected to and driven by the driven sheave, said input shaft being axially shiftable relative to the housing into alternate axial positions; a planetary gear train mounted in the housing and including first, second and third planetary elements and planetary pinion means carried by one element and meshing with the other two, the first element being drivingly connected to the cylinder shaft, the second element being connected to the housing and the third element including alternate gear means alternately connected to and driven by the input shaft in the alternate axial positions of the shaft to establish alternate driving connections between the input shaft and the first element.

2. The invention defined in claim 1 wherein the input shaft is axially shiftable relative to the driven sheave.

3. The invention defined in claim 2 wherein the planetary pinion means are carried by the first planetary element and each planetary pinion means includes alternate coaxially attached gear means respectively meshing with the alternate third element gear means, one of said alternate pinion gear means also meshing with the second element.

4. The invention defined in claim 3 wherein the second planetary element is the planetary ring gear and the third p.anetary element is the sun gear, the third planetary element gear means having internal splines and the input shaft having alternate external splines engageable with said internal splines in the alternate shaft positions.

5. The invention defined in claim 4 wherein the input shaft is also axially shiftable into a neutral position wherein it is disengaged from the third planetary element.

6. The invention defined in claim 4 wherein the input shaft is axially shiftable into a direct drive position wherein it positively engages the first planetary element for rotation of the input shaft and the first planetary element in unison.

7. A multi-range infinitely variable transmission comprising: an infinitely variable belt drive including a variable diameter driven sheave; an input shaft drivingly connected to the driven sheave, coaxially extending through said sheave and axially shiftable relative thereto into alternate axial positions; first and second alternate sun gears coaxially disposed on said shaft and alternately connected to and driven by the shaft in the alternate shaft position; a fixed ring gear coaxially disposed relative to said sun gears; a rotatable planetary carrier coaxially disposed relative to said ring gear; and planetary pinion means rotatably carried by said carrier and including a first pinion gear constantly meshing with the first sun gear and the ring gear and a second pinion gear coaxially attached to the first pinion gear and constantly meshing with the second sun gear.

8. The invention defined in claim 7 wherein the input shaft is axially shiftable into a third alternate position wherein it drivingly engages the planetary carrier, for rotation of the carrier and input shaft in unison.

References Cited
UNITED STATES PATENTS

| | | | |
|---|---|---|---|
| 1,370,378 | 3/1921 | Starr | 74—750 |
| 1,417,798 | 5/1922 | Cook et al. | 74—750 |
| 1,745,075 | 1/1930 | Wise | 74—750 |
| 1,773,699 | 8/1930 | Wasbauer | 74—750 |
| 1,777,997 | 10/1930 | Wise | 74—750 |
| 2,137,778 | 11/1938 | McCullough | 74—750 |
| 2,603,327 | 7/1952 | King | 74—750 X |
| 2,787,919 | 4/1957 | Senkowski et al. | 74—750 |
| 3,146,633 | 9/1964 | Schmitter et al. | 74—722 X |
| 3,251,243 | 5/1966 | Kress | 74—740 X |
| 3,303,725 | 2/1967 | Knosp | 74—740 |

DONLEY J. STOCKING, *Primary Examiner.*

THOMAS C. PERRY, *Examiner.*